US011105977B1

(12) United States Patent
Puckett et al.

(10) Patent No.: US 11,105,977 B1
(45) Date of Patent: Aug. 31, 2021

(54) DEVICE FOR THE EMISSION OF ARBITRARY OPTICAL BEAM PROFILES FROM WAVEGUIDES INTO TWO-DIMENSIONAL SPACE

(71) Applicant: Honeywell International Inc., Morris Plains, NJ (US)

(72) Inventors: Matthew Wade Puckett, Phoenix, AZ (US); Karl D. Nelson, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/803,712

(22) Filed: Feb. 27, 2020

(51) Int. Cl.
| G02B 6/124 | (2006.01) |
| G02B 6/136 | (2006.01) |
| G02B 6/34 | (2006.01) |
| G02B 6/12 | (2006.01) |

(52) U.S. Cl.
CPC ............ *G02B 6/124* (2013.01); *G02B 6/136* (2013.01); *G02B 6/34* (2013.01); *G02B 2006/12061* (2013.01); *G02B 2006/12107* (2013.01)

(58) Field of Classification Search
None
See application file for complete search history.

(56) References Cited

U.S. PATENT DOCUMENTS

| 4,776,661 A * | 10/1988 | Handa | ................ | G02B 6/12004 |
| | | | | 385/130 |
| 5,226,100 A | 7/1993 | Maerz | | |
| 6,493,487 B1 | 12/2002 | Temkin et al. | | |
| 7,310,468 B2 | 12/2007 | Kittaka et al. | | |
| 7,327,924 B2 | 2/2008 | Brueck et al. | | |
| 7,454,103 B2 | 11/2008 | Parriaux | | |
| 7,720,334 B1 | 5/2010 | Mossberg et al. | | |
| 7,724,997 B2 | 5/2010 | Kittaka et al. | | |

(Continued)

FOREIGN PATENT DOCUMENTS

| EP | 0325251 A2 | 7/1989 |
| EP | 1338906 A1 | 8/2003 |

OTHER PUBLICATIONS

Puckett, Matthew W. et al., "Device for Emission of Arbitrary Optical Beam Profiles From a Chip to Free Space", U.S. Appl. No. 16/800,877, filed Feb. 25, 2020, pp. 1-33, Published: US.

(Continued)

*Primary Examiner* — Michelle R Connelly
(74) *Attorney, Agent, or Firm* — Fogg & Powers LLC (57) ABSTRACT

An optical coupler device comprises an optical waveguide having a first edge and an opposing second edge that extend in a direction substantially parallel to a propagation direction of an input light beam injected into the optical waveguide. A grating structure is on a portion of the optical waveguide, with the grating structure having a first side and an opposing second side. The first and second sides of the grating structure extend in the same direction as the first and second edges of the optical waveguide. An optical slab adjoins with the first side of the grating structure and is in optical communication with an output of the grating structure. The grating structure includes an array of grating lines configured to diffract the input light beam into the slab at an angle with respect to the propagation direction, such that a diffracted light beam is output from the slab.

19 Claims, 4 Drawing Sheets

(56) References Cited

U.S. PATENT DOCUMENTS

| | | | |
|---|---|---|---|
| 2004/0208444 A1 | 10/2004 | Grunnet-Jepsen et al. |
| 2014/0363127 A1 | 12/2014 | Baets et al. |
| 2016/0238787 A1 | 8/2016 | Nadovich |
| 2019/0331866 A1 | 10/2019 | Mekis et al. |

OTHER PUBLICATIONS

European Patent Office, "Extended European Search Report from EP Application No. 20212909.4", from Foreign Counterpart to U.S. Appl. No. 16/803,712, dated Apr. 30, 2021, pp. 1 through 10, Published: EP.

\* cited by examiner

DEVICE FOR THE EMISSION OF ARBITRARY OPTICAL BEAM PROFILES FROM WAVEGUIDES INTO TWO-DIMENSIONAL SPACE

STATEMENT REGARDING FEDERALLY SPONSORED RESEARCH OR DEVELOPMENT

This invention was made with Government support under HR0011-16-C-0122 awarded by DARPA. The Government has certain rights in the invention.

BACKGROUND

In integrated photonics it is often necessary to transition the spatial dimensions of a light wave from a highly confined waveguide state to a more broadly spatially distributed state compatible with free-space optics. An important field in which this functionality is desirable is the generation of free-space beams, derived from integrated photonics waveguides, for use with magneto-optic traps (MOTs).

The most straightforward way to couple an integrated photonics waveguide mode into a wide slab mode is to direct a waveguide into a slab and allow the light to diverge naturally. There are, however, various shortcomings which are intrinsic to this approach. For instance, a significant amount of propagation is required to allow the light beam to diverge to any required size, and this can take up valuable real estate on the surface of the integrated photonics chip. Further, only a Gaussian profile may be realized in this manner, whereas a uniform intensity distribution is often more desirable. Additionally, the beam which this approach generates is diverging, whereas a collimated beam is often more needed to be generated.

SUMMARY

An optical coupler device comprises an optical waveguide having a first edge and an opposing second edge that extend in a direction substantially parallel to a propagation direction of an input light beam injected into the optical waveguide, with the optical waveguide having a waveguide width between the first and second edges. A grating structure is on a portion of the optical waveguide, with the grating structure having a first side and an opposing second side. The first and second sides of the grating structure extend in the same direction as the first and second edges of the optical waveguide, with the grating structure having a grating width between the first and second sides. An optical slab adjoins with the first side of the grating structure and is in optical communication with an output of the grating structure. The grating structure includes an array of grating lines that are angled with respect to the propagation direction of the input light beam. The grating lines are configured to diffract the input light beam into the optical slab at an angle with respect to the propagation direction of the input light beam, such that a diffracted light beam is output from the optical slab.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

An optical coupler device for the emission of arbitrary optical beam profiles from a waveguide into two-dimensional space is described herein. The optical coupler device can be implemented as a waveguide-to-slab coupler that is particularly suited to provide that a wide two-dimensional light wave be initially generated from an integrated photonics waveguide.

In conventional optical devices used in integrated photonics, a waveguide is normally incident upon a slab. Such a configuration has several problems, including that the spatial expansion of the incident light beam is gradual, the light beam is diverging, and amplitude distribution of the light beam is fixed at a Gaussian. The present approach solves these problems by introducing a grating into a waveguide and positioning a slab to one side of the grating to produce a waveguide-to-slab coupler.

A light beam propagating along the waveguide of the waveguide-to-slab coupler can be made to diffract off of the grating and into the slab at an angle, such as about 90 degrees. The grating strength can be modified by changing a width of the grating within the waveguide. By using a grating with a spatially dependent width, a light beam, propagating in the slab to the side of the waveguide, can be generated with any desired intensity distribution. Further, the light beam in this slab does not require any particular propagation length, for gradual expansion of the light beam, in contrast to prior techniques. In addition, the light beam output from the slab is collimated, rather than diverging, making the light beam more easily interfaced with out-of-plane grating couplers.

To make the present optical coupler device, a waveguide can be formed on an integrated photonics chip through any number of established fabrication processes. Using the design of a first lithography mask, the process can direct the waveguide into one edge of a large slab. After applying this mask to a first round of lithography and etching, the process applies a second lithography mask to the sample. The process then etches a grating partially into the waveguide, and also etches partially into the slab. This results in a waveguide-to-slab coupler in which the waveguide couples light gradually into the slab through grating diffraction, such as at a 90 degree angle from its original direction of propagation, and at a controllable coupling rate, which is controllable via the grating width.

The waveguide-to-slab coupler is particularly suited for use in an integrated photonics chip such as a silicon photonics chip, which is used in the generation of free space beams for a magneto-optic trap (MOT). Such a chip is designed to emit light beams at designed angles into free space, such as three expanded beams that intersect with each other in free space for use in a MOT. The waveguide-to-slab coupler takes input light from a single waveguide mode, and uses the grating to convert the input light into a slab mode of diffracted light in-plane, in which the diffracted light has a uniform amplitude and predetermined set width. This diffracted light can then be interfaced with out-of-plane grating couplers on the chip to produce the expanded beams that intersect with each other in free space.

Further details of various embodiments are described hereafter with reference to the drawings.

Figure 1:
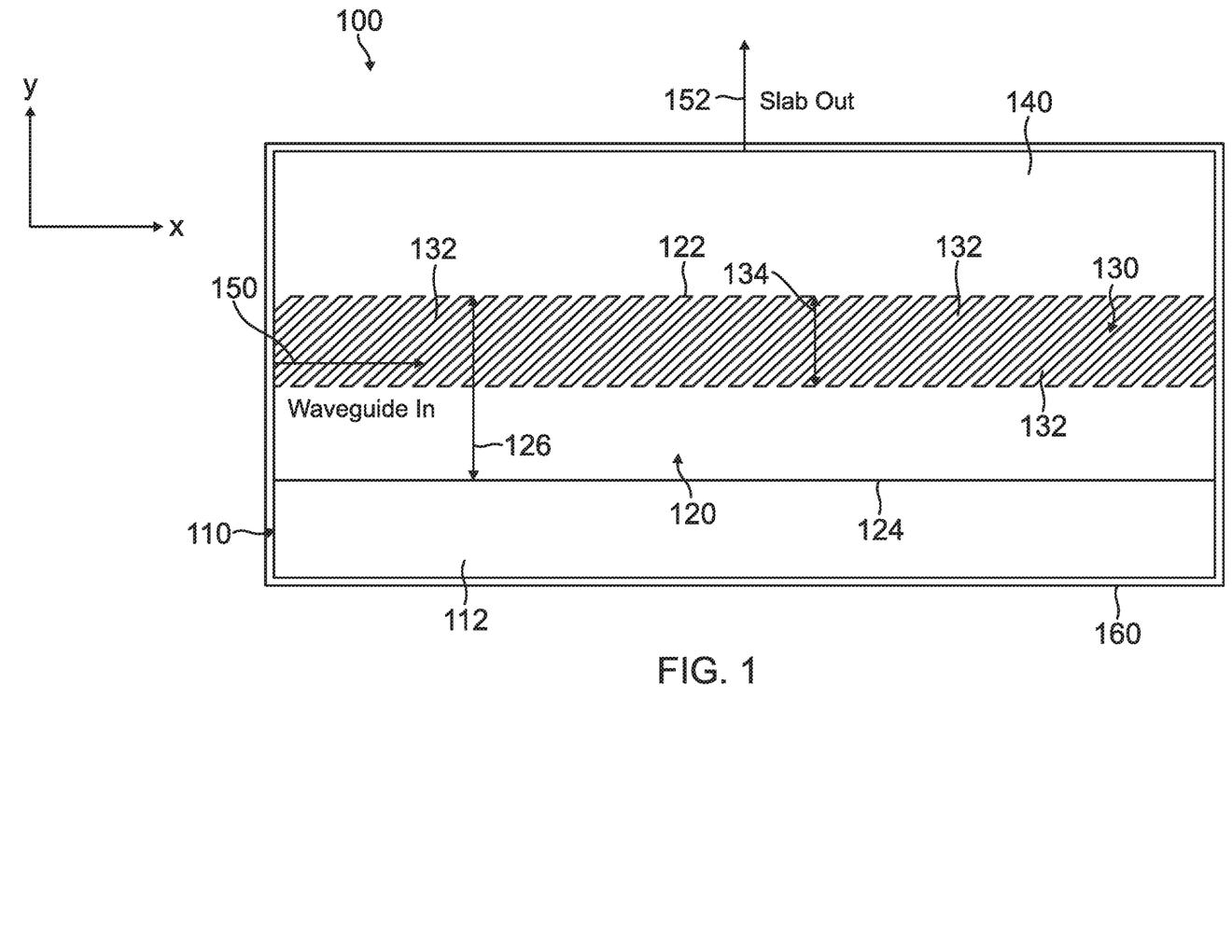
FIG. 1 is a schematic top plan view of a waveguide-to-slab coupler according to one embodiment.

FIG. 1 is a schematic top plan view of an optical coupler device comprising a waveguide-to-slab coupler 100, according to one embodiment. The waveguide-to-slab coupler 100 includes a substrate 110 having an upper surface 112, and an input optical waveguide 120 supported on upper surface 112 of substrate 110. The waveguide 120 has a first edge 122 and an opposing second edge 124 that extend in a direction substantially parallel to a propagation direction (x-axis) of an input light beam 150 injected into waveguide 120. The waveguide 120 has a waveguide width 126 having a first distance between first edge 122 and second edge 124.

A grating structure 130 is formed on a portion of waveguide 120 so as to extend along a section of waveguide 120 adjacent to first edge 122. The grating structure 130 includes an array of grating lines 132 that are angled with respect to the propagation direction of input light beam 150. In this embodiment, grating structure 130 has a grating width 134 that is less than the waveguide width 126.

An output optical slab 140, supported by substrate 110, borders grating structure 130 along first edge 122 and is in optical communication with grating structure 130. The waveguide 120, grating structure 130, and slab 140 are substantially planar with respect to each other, such that input light beam 150 and a diffracted light 152 beam propagate in substantially the same plane.

As discussed further hereafter, grating structure 130 has a grating strength that is a function of grating width 134, such that the grating strength increases with an increase in the size of grating width 134. For example, grating width 134 can have a range of about 0.2 microns to about 10 microns. In addition, the size ratio of grating width 134 with respect to waveguide width 126 can be greater than 0 and up to 1.

In this embodiment, waveguide 120 and grating structure 130 can be formed to have a first thickness above substrate 110, and slab 140 can be formed to have a second thickness that is less than the first thickness. Alternatively, waveguide 120 can be formed to have the same thickness as slab 140, such that grating structure 130 has a thickness greater than the thickness of waveguide 120 and slab 140.

The substrate 110 can be a cladding layer and is composed of a lower refractive index material, such as silicon dioxide ($SiO_2$), aluminum oxide ($Al_2O_3$), magnesium oxide (MgO), or potassium chloride (KCl). The substrate layer 110 can be coupled onto an integrated photonics chip, such as a silicon photonics chip.

The waveguide 120, grating structure 130, and slab 140 are composed of a higher refractive index material, such as silicon nitride ($Si_3N_4$), silicon (Si), titanium dioxide ($TiO_2$), gallium arsenide (GaAs), or gallium nitride (GaN).

To operate waveguide-to-slab coupler 100, input light beam 150 is injected from an optical source into waveguide 120. The input light beam 150 propagates along waveguide 120 and is gradually diffracted by grating structure 130 into slab 140 at about a 90 degree angle (y-axis) with respect to the propagation direction of input light beam 150. The diffracted light beam 152, which is collimated, is then output from slab 330.

The grating is designed to cancel out an x-component of the momentum of the light beam traveling along the x-axis, and to add a y-component to the momentum of the light beam, such that the light beam is diffracted to propagate along the y-axis. The grating produces a distributed effect, so the light beam gradually leaves the waveguide and enters the slab traveling in the same direction.

The grating gradually and controllably diffracts light into the slab. The rate of diffraction can be controlled by changing the grating width relative to the waveguide width. The grating strength of the waveguide-to-slab coupler can be modified by changing the grating width within the waveguide. By using a grating with a spatially dependent width, the light beam, propagating through the slab, can be generated with any desired intensity distribution.

Figure 2:
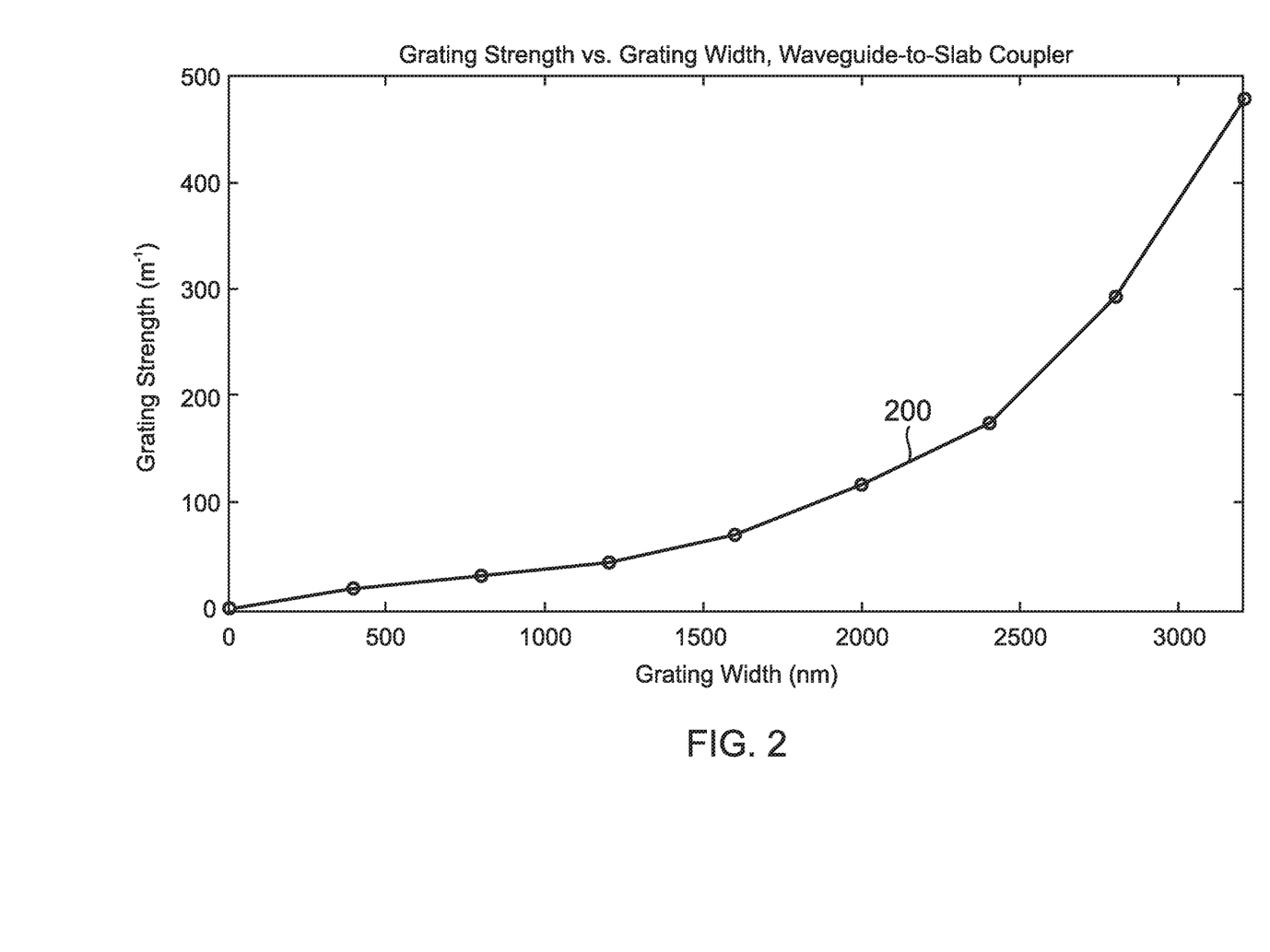
FIG. 2 is a graph of theoretical simulations of grating strength as a function of grating width within a waveguide-to-slab coupler.

FIG. 2 is a graph of theoretical simulations of the grating strength as a function of grating width within a waveguide-to-slab coupler. As shown in the graph of FIG. 2, the grating strength can be controlled by changing the grating width. As the grating width is increased, such as from about 500-3000 nm, a corresponding increase in grating strength is produced as indicated by plot line 200.

Figure 3:
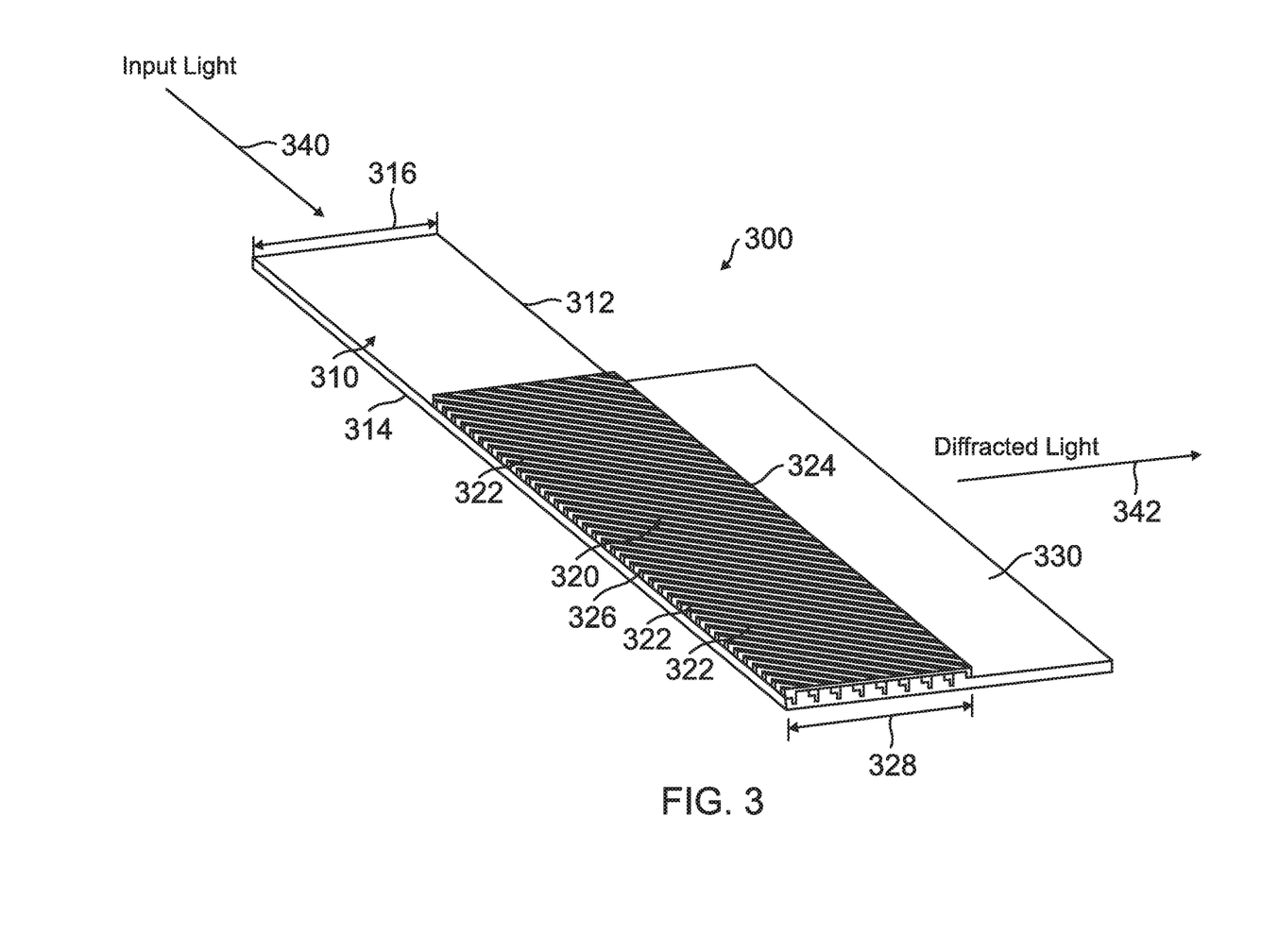
FIG. 3 is a schematic orthogonal view of a waveguide-to-slab coupler, according to another embodiment.

FIG. 3 is a schematic orthogonal view of a waveguide-to-slab coupler 300, according to another embodiment. The waveguide-to-slab coupler 300 comprises an input waveguide 310, a grating structure 320 on a portion of waveguide 310, and an output slab 330 that adjoins with one side of grating structure 320.

The waveguide 310 has a first edge 312 and an opposing second edge 314 that extend in a direction substantially parallel to a propagation direction of an input light beam 340 injected into waveguide 310. The waveguide 310 has a waveguide width 316 between first edge 312 and second edge 314.

The grating structure 320 is written on a portion of waveguide 310 adjacent to slab 330. The grating structure 320 includes an array of grating lines 322 that are angled with respect to the propagation direction of input light beam 340. The grating structure 320 has a first side 324 and an opposing second side 326, which extend in the same direction as first edge 312 and second edge 314 of waveguide 310.

The grating structure 320 has a grating width 328 between first side 324 and second side 328. In this embodiment, grating width 328 is substantially the same as waveguide width 316. In other embodiments, the grating width can be varied to be less than the waveguide width, such as described previously.

In this embodiment, grating structure 320 is formed to have a first thickness, with waveguide 310 and slab 330 formed to have a second thickness that is less than the first thickness.

The slab 330 adjoins with first side 324 of grating structure 320 such that slab 330 is in optical communication with an output of grating structure 320. The grating lines 322 are configured to diffract input light beam 340 into slab 330 at an angle with respect to the propagation direction of input light beam 340, such that a diffracted light beam 342 is output from slab 330.

Figure 4:
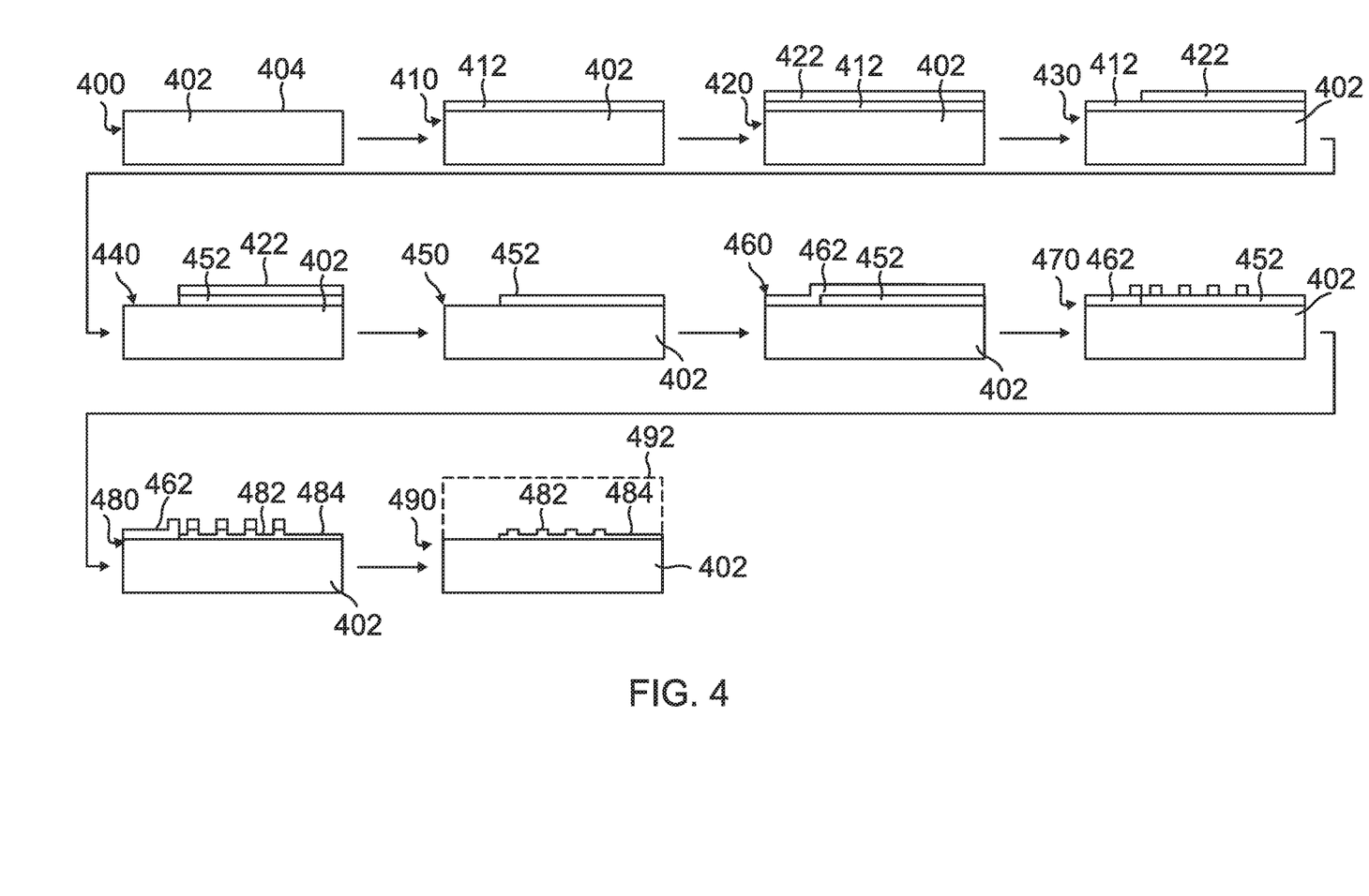
FIG. 4 shows schematic side views of a method for fabricating a waveguide-to-slab coupler, according to an exemplary approach.

FIG. 4 illustrates schematic side views of a method for fabricating an optical coupler device such as a waveguide-to-slab coupler, according to one exemplary approach. Initially, as shown in step 400, a substrate layer 402 is provided such as an initial wafer, which has an upper surface 404. The substrate layer 402 can be a lower cladding layer and is composed of a lower refractive index material, such as silicon dioxide. The substrate layer 402 can also include an underlying handle wafer such as a silicon handle. The substrate layer 402 can be coupled to a silicon photonics chip.

As depicted in step 410, a guiding layer 412 is deposited on upper surface 404 of substrate layer 402, such as by a conventional deposition process. The guiding layer 412 includes a higher refractive index material, such as silicon nitride. Next, as shown in step 420 a first resist spinning process is carried out to form a first resist layer 422 over guiding layer 412. Thereafter, as depicted in step 430, a first resist development process is performed such as by lithography, to form an initial waveguide pattern that exposes portions of guiding layer 412.

As shown in step 440, a first etching step is then carried out to remove the exposed portions of guiding layer 412 to form a waveguide layer 452 under first resist layer 422. The waveguide layer 452 includes an input waveguide portion that is coupled to one edge of a slab portion. This is followed in step 450 by a first resist removal process to remove first resist layer 422 and expose waveguide layer 452. Next, as shown in step 460, a second resist spinning process is carried out to form a second resist layer 462 over waveguide layer 452 and an upper surface portion of substrate layer 402.

Thereafter, as depicted in step 470, a second resist development process is performed such as by lithography, to form a grating pattern that exposes portions of waveguide layer 452. Next, as shown in step 480, a second etching step is then carried out to remove some of the material of waveguide layer 452 to form a grating 482 in a part of the input waveguide portion, and to reduce a thickness of the slab portion to form an output slab 484. This is followed in step 490 by a second resist removal process to remove second resist layer 462, such that the input waveguide portion, grating 482, and slab 484 form a waveguide-to-slab coupler.

The waveguide-to-slab coupler is formed to have a substantially planar shape on substrate layer 402. The grating 482 can be formed to have a width that is the same as, or less than, a total width of the waveguide portion.

Optionally, an upper cladding layer 492 can be formed over the waveguide-to-slab coupler formed on substrate layer 402, such as by a conventional deposition process, to further protect the waveguide-to-slab coupler. The upper cladding layer 492 can include a lower refractive index material, such as silicon dioxide.

EXAMPLE EMBODIMENTS

Example 1 includes an optical coupler device, comprising: an optical waveguide having a first edge and an opposing second edge that extend in a direction substantially parallel to a propagation direction of an input light beam injected into the optical waveguide, the optical waveguide having a waveguide width between the first and second edges; a grating structure on a portion of the optical waveguide, the grating structure having a first side and an opposing second side, the first and second sides of the grating structure extending in the same direction as the first and second edges of the optical waveguide, the grating structure having a grating width between the first and second sides; and an optical slab that adjoins with the first side of the grating structure, the optical slab in optical communication with an output of the grating structure; wherein the grating structure includes an array of grating lines that are angled with respect to the propagation direction of the input light beam, the grating lines configured to diffract the input light beam into the optical slab at an angle with respect to the propagation direction of the input light beam, such that a diffracted light beam is output from the optical slab.

Example 2 includes the optical coupler device of Example 1, wherein the optical waveguide, the grating structure, and the optical slab are substantially planar with respect to each other.

Example 3 includes the optical coupler device of any of Examples claim 1-2, wherein the input light beam and the diffracted light beam propagate in substantially the same plane.

Example 4 includes the optical coupler device of any of Examples 1-3, wherein the grating lines are configured to diffract the input light beam into the optical slab such that the diffracted light beam is output from the optical slab at about a 90 degree angle with respect to the propagation direction of the input light beam.

Example 5 includes the optical coupler device of any of Examples 1-4, wherein the diffracted light beam output from the optical slab is a collimated beam.

Example 6 includes the optical coupler device of any of Examples 1-5, wherein the grating structure has a grating strength that is a function of the grating width, such that the grating strength increases with an increase in the grating width.

Example 7 includes the optical coupler device of any of Examples 1-6, wherein the grating width is same as, or less than, the waveguide width.

Example 8 includes the optical coupler device of any of Examples 1-7, wherein the grating width has a range of about 0.2 microns to about 10 microns.

Example 9 includes the optical coupler device of any of Examples 1-8, wherein a size ratio of the grating width with respect to the waveguide width is greater than 0 and up to about 1.

Example 10 includes the optical coupler device of any of Examples 1-9, further comprising a substrate that supports the optical waveguide, the grating structure, and the optical slab.

Example 11 includes the optical coupler device of Example 10, wherein the substrate comprises a first material having a first refractive index.

Example 12 includes the optical coupler device of Example 11, wherein the optical waveguide, the grating structure, and the optical slab each comprise a second material having a second refractive index that is greater than the first refractive index.

Example 13 includes the optical coupler device of Example 12, wherein the first material comprises silicon dioxide, and the second material comprises silicon nitride.

Example 14 includes the optical coupler device of any of Examples 10-13, wherein the substrate is coupled to an integrated photonics chip.

Example 15 includes a method of fabricating an optical coupler device, the method comprising: providing a substrate layer having an upper surface, the substrate layer including a first material having a first refractive index; depositing a guiding layer on the upper surface of the substrate layer, the guiding layer including a second material having a second refractive index that is greater than the first refractive index; forming a first resist layer over the guiding layer; forming an initial waveguide pattern that exposes portions of the guiding layer; etching the exposed portions of the guiding layer to form a waveguide layer, wherein the waveguide layer includes an input waveguide portion coupled to one edge of a slab portion; removing the first resist layer to expose the waveguide layer; forming a second resist layer over the waveguide layer; forming a grating pattern that exposes portions of the waveguide layer; etching the exposed portions of the waveguide layer to form a grating in part of the input waveguide portion, and to reduce a thickness of the slab portion to form an output slab; and removing the second resist layer such that the input waveguide portion, the grating, and the output slab, form a waveguide-to-slab coupler.

Example 16 includes the method of Example 15, further comprising forming an upper cladding layer over the waveguide-to-slab coupler after removing the second resist layer, the upper cladding layer comprising the first material having the first refractive index.

Example 17 includes the method of any of Examples 15-16, wherein the first material comprises silicon dioxide, and the second material comprises silicon nitride.

Example 18 includes the method of any of Examples 15-17, wherein the waveguide-to-slab coupler is formed to have a substantially planar shape.

Example 19 includes the method of any of Examples 15-18, wherein the grating is formed to have a width that is the same as, or less than, a total width of the waveguide portion.

Example 20 includes the method of any of Examples 15-19, wherein the substrate layer is coupled to a silicon photonics chip.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. An optical coupler device, comprising:
    an optical waveguide having a first edge and an opposing second edge that extend in a direction substantially parallel to a propagation direction of an input light beam injected into the optical waveguide, the optical waveguide having a waveguide width between the first and second edges;
    a grating structure on a portion of the optical waveguide, the grating structure having a first side and an opposing second side, the first and second sides of the grating structure extending in the same direction as the first and second edges of the optical waveguide, the grating structure having a grating width between the first and second sides, wherein the grating width is less than the waveguide width; and
    an optical slab that adjoins with the first side of the grating structure, the optical slab in optical communication with an output of the grating structure;
    wherein the grating structure includes an array of grating lines that are angled with respect to the propagation direction of the input light beam, the grating lines configured to diffract the input light beam into the optical slab at an angle with respect to the propagation direction of the input light beam, such that a diffracted light beam is output from the optical slab.

2. The optical coupler device of claim 1, wherein the optical waveguide, the grating structure, and the optical slab are substantially planar with respect to each other.

3. The optical coupler device of claim 2, wherein the input light beam and the diffracted light beam propagate in substantially the same plane.

4. The optical coupler device of claim 3, wherein the grating lines are configured to diffract the input light beam into the optical slab such that the diffracted light beam is output from the optical slab at about a 90 degree angle with respect to the propagation direction of the input light beam.

5. The optical coupler device of claim 1, wherein the diffracted light beam output from the optical slab is a collimated beam.

6. The optical coupler device of claim 1, wherein the grating structure has a grating strength that is a function of the grating width, such that the grating strength increases with an increase in the grating width.

7. The optical coupler device of claim 1, wherein the grating width has a range of about 0.2 microns to about 10 microns.

8. The optical coupler device of claim 1, wherein a size ratio of the grating width with respect to the waveguide width is greater than 0 and less than 1.

9. The optical coupler device of claim 1, further comprising a substrate that supports the optical waveguide, the grating structure, and the optical slab.

10. The optical coupler device of claim 9, wherein the substrate comprises a first material having a first refractive index.

11. The optical coupler device of claim 10, wherein the optical waveguide, the grating structure, and the optical slab each comprise a second material having a second refractive index that is greater than the first refractive index.

12. The optical coupler device of claim 11, wherein the first material comprises silicon dioxide, and the second material comprises silicon nitride.

13. The optical coupler device of claim 9, wherein the substrate is coupled to an integrated photonics chip.

14. The optical coupler device of claim 1, wherein a rate of diffraction of the diffracted light beam is controllable by adjusting the grating width relative to the waveguide width.

15. A method of fabricating an optical coupler device, the method comprising:
    providing a substrate layer having an upper surface, the substrate layer including a first material having a first refractive index;
    depositing a guiding layer on the upper surface of the substrate layer, the guiding layer including a second material having a second refractive index that is greater than the first refractive index;
    forming a first resist layer over the guiding layer;
    forming an initial waveguide pattern that exposes portions of the guiding layer;
    etching the exposed portions of the guiding layer to form a waveguide layer, wherein the waveguide layer includes an input waveguide portion coupled to one edge of a slab portion;
    removing the first resist layer to expose the waveguide layer;
    forming a second resist layer over the waveguide layer;
    forming a grating pattern that exposes portions of the waveguide layer;
    etching the exposed portions of the waveguide layer to form a grating in part of the input waveguide portion, and to reduce a thickness of the slab portion to form an output slab, wherein the grating is formed to have a width that is less than a total width of the input waveguide portion; and
    removing the second resist layer such that the input waveguide portion, the grating, and the output slab, form a waveguide-to-slab coupler.

16. The method of claim 15, further comprising:
    forming an upper cladding layer over the waveguide-to-slab coupler after removing the second resist layer, the upper cladding layer comprising the first material having the first refractive index.

17. The method of claim 16, wherein the first material comprises silicon dioxide, and the second material comprises silicon nitride.

18. The method of claim 15, wherein the waveguide-to-slab coupler is formed to have a substantially planar shape.

19. The method of claim 15, wherein the substrate layer is coupled to a silicon photonics chip.

\* \* \* \* \*